United States Patent [19]

Rueck

[11] 4,208,201

[45] Jun. 17, 1980

[54] PROCESS AND APPARATUS FOR TREATMENT OF EXHAUST GASES FROM GLASS MELTING FURNACES

[75] Inventor: Jon M. Rueck, Silver Lake, Kans.

[73] Assignee: Owens-Corning Fiberglas Corporation, Toledo, Ohio

[21] Appl. No.: 750,777

[22] Filed: Dec. 15, 1976

Related U.S. Application Data

[63] Continuation of Ser. No. 577,581, May 15, 1975, abandoned.

[51] Int. Cl.² .......................... C03C 1/00; B01D 46/02
[52] U.S. Cl. ........................................... 65/27; 55/73; 55/341 R; 65/168
[58] Field of Search ................ 55/1, 73, 77, 97, 312, 55/314, 341; 65/27, 168

[56] References Cited

U.S. PATENT DOCUMENTS

| | | | |
|---|---|---|---|
| 1,563,125 | 11/1925 | Ward | 55/314 X |
| 1,739,367 | 12/1929 | Love | 55/314 |
| 2,875,844 | 3/1959 | Pring | 55/77 |
| 3,173,980 | 3/1965 | Hysinger | 55/314 |
| 3,789,628 | 2/1974 | Mahoney | 65/27 |
| 3,790,143 | 2/1974 | Nix | 55/77 X |
| 3,798,877 | 3/1974 | Lamb | 55/97 X |
| 3,880,629 | 4/1975 | Dulin et al. | 65/27 |

Primary Examiner—Robert H. Spitzer
Attorney, Agent, or Firm—Charles F. Schroeder; Allen D. Gutchess, Jr.

[57] ABSTRACT

An improvement in the treatment of exhaust gases from glass melting furnaces is provided. Exhaust gases from such furnaces contain pollutants or contaminants in the form of condensibles which have been difficult to remove. To render these condensibles more easily removed and so that a higher percentage of them are separated from the exhaust gases, the exhaust gases are combined with other gases containing particles and specifically with gases containing inert batch dust from a source of glass batch. These gases contain relatively large particles which act as nuclei on which condensibles in the furnace exhaust gases can condense. The relatively large particles also serve as reaction sites on which reactable components in the furnace exhaust gases can chemically react to produce reaction products which condense more readily and are easier to collect. The larger particles and the additional condensation products from the combined gases can be more readily filtered out so that fewer pollutants or contaminants escape. The collected particles or dust can then be taken back to the batch source for subsequent use.

5 Claims, 2 Drawing Figures

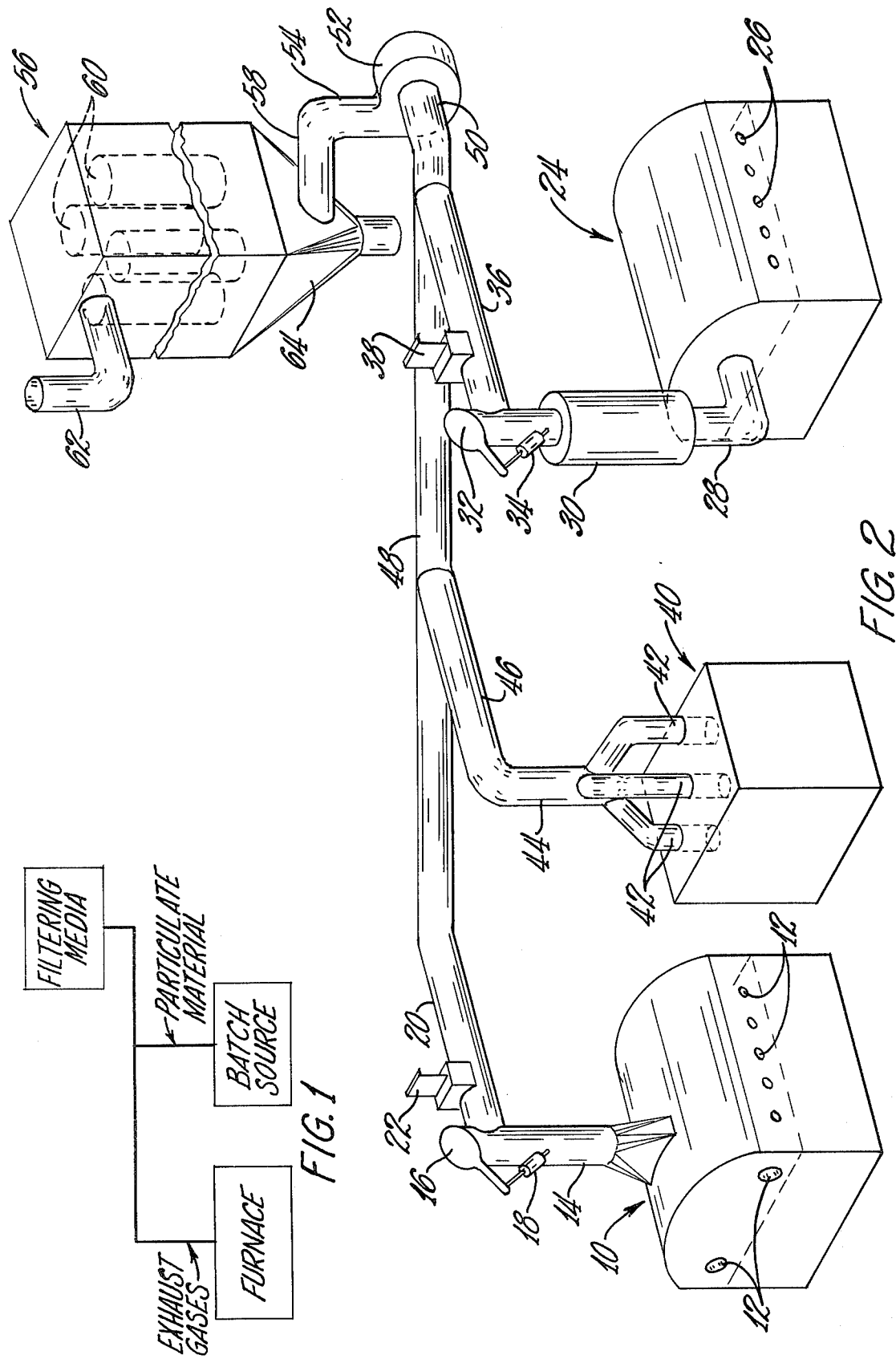

PROCESS AND APPARATUS FOR TREATMENT OF EXHAUST GASES FROM GLASS MELTING FURNACES

This is a continuation of application Ser. No. 577,581, filed May 15, 1975, now abandoned.

This invention relates to a pollutant-control system and more particularly to a system for increasing the percent of contaminants collected from exhaust gases.

Exhaust gases, particularly from glass melting furnaces, contain contaminants in the form of condensible particles which are difficult to remove from the gases. The exhaust gases commonly contain sodium tetraborate or commercial borax. Other alkali borates also often exist in the furnace exhaust gases and are highly volatile, rendering them difficult to remove. Subsequent to leaving the furnaces, the exhaust gases are passed through a bag house containing filtering media or bags which remove substantial portions of the contaminants in the exhaust gases but often not to the extent desired, particularly where condensibles such as sodium tetraborate are concerned.

The present invention is based upon the discovery that the furnace exhaust gases can be combined with a gas containing inert particles with the result that the contaminants in the combined gases can be more fully separated or filtered out. More specifically, the gas containing the inert particles can be ventilating air taken from a batch source which can be in the form of a batch house. To achieve this, an exhaust fan can be connected with the furnace stack and with one or more ventilating ducts of the batch house to establish a combined flow of the exhaust gases and the ventilating air and to direct them subsequently through filtering bags in a bag house. Fewer contaminants are then exhausted in the gases from the bag house by use of the combination of gases, than if only the furnace exhaust gases are directed through the bag house.

The improvement in the reduction of contaminants or pollutants in the exhaust gases is believed to result from certain benefits achieved with the presence of the particles in the ventilating gas or air from the batch source. These relatively large particles are believed to act as nuclei upon which condensibles in the furnace exhaust gases can condense and do condense more readily than otherwise. The large particles are also believed to serve as reaction or mixing sites upon which reactable components in the gases can react or mix to form products which are more readily condensible. For example, it is believed that a boron group, $B_2O_3$ or $B_4O_7$, may react or combine with calcium from the batch ventilating air or that possibly volatile salts of boric acid react or mix with volatiles from the furnace exhaust gases and the ventilating air. At least if sufficient water vapor is present, it is believed that calcium tetraborate may result which is more readily condensible and does not react further. In addition, the combining of the relatively cool batch air with the furnace exhaust gases reduces the temperature of the furnace exhaust gases to promote further condensation of the condensibles therein.

The increased amount of condensed materials from the furnace exhaust products are then more effectively removed by the filtering media or bags in the bag house. From time-to-time, the filtering media can be cleaned, with the separated contaminants or dust then returned to the batch source for use in the furnace.

It is, therefore, a principal object of the invention to remove greater amounts of pollutants or contaminants from furnace exhaust gases.

Another object of the invention is to combine furnace exhaust gases with gases containing inert particles prior to passing the combined gases through filtering media, in order to remove larger amounts of contaminants from the exhaust gases.

Yet a further object of the invention is to combine furnace exhaust gases with gases containing relatively large particles to cause larger amounts of contaminants in the furnace exhaust gases to condense out and be more readily collectible.

Many other objects and advantages of the invention will be apparent from the following detailed description of preferred embodiments thereof, reference being made to the accompanying drawings, in which:

FIG. 1 is a diagrammatic view of a pollutant-control system according to the invention; and FIG. 2 is a schematic view in perspective of an installation embodying the pollutant-control system according to the invention.

The pollutant-control system according to the invention is shown in its basic form in FIG. 1. The exhaust gases from a furnace, and particularly a glass melting furnace, contain condensible materials which are difficult to remove from the exhaust gases. Many of these condensibles result from volatilization of components in the glass batch in the furnace. Before being emitted to the atmosphere, the exhaust gases are commonly passed through filtering media which removes a substantial portion of such condensibles, but often not as high a percentage as is desirable. Sodium tetraborate or commercial borax is a common one of those contaminants.

By adding particulate material, preferably from a batch source, to the exhaust gases, it has been discovered that a higher percentage of the condensibles can be removed by the filtering media. The particles preferably are of a size such that they can readily be removed by the filtering media in the first place, being mostly in the order of ten microns or more in diameter. The particles in the exhaust gases apparently form nuclei upon which the condensibles in the exhaust gases will more readily condense. The particles with the condensibles condensed thereon can then be relatively easily filtered from the exhaust gases. The particles apparently perform a second function in the exhaust gases in that they act as reaction or mixing sites for reactable components of the exhaust gases. Thus, by way of example, it is believed that calcium from the batch dust can react or mix with $B_2O_3$ or $B_4O_7$ in the exhaust gases or that volatile salts of boric acid mix with other volatiles in the gases from the batch source and furnace. In either case, at least if sufficient water vapor is present, it is believed that calcium tetraborate results which tends to condense at high temperatures, above 1500° F., so that it will readily condense from the exhaust gases as they cool well below such temperatures prior to reaching the filtering media. Combining the hot furnace exhaust gases with the relatively cool air or gas from the batch source has a cooling effect on the exhaust gases so that condensibles also will tend to condense more readily from the exhaust gases for this reason. Whether or not all of the above actually occur, nevertheless, the invention does result in more contaminants being removed from the furnace gases.

From time-to-time, the material collected by the filtering media from the exhaust gases can be returned to the batch source for use, so that little batch material is wasted.

A specific application of the invention is shown in the schematic representation of FIG. 2. A first glass melting furnace is indicated at 10, with batch being supplied to the furnace by a screw feeder (not shown) located at the left end thereof. Heating is achieved by a plurality of fuel oil or gas fired burners indicated at 12. Exhaust gases from the furnace 10 exit through a stack 14 located in an intermediate portion of the furnace 10 in this instance. Above the roof (not shown) located above the furnace 10, a stack cap 16 is provided which can be opened by a fluid-operated cylinder 18, if necessary, to exhaust the gases directly upwardly. This can occur, for example, if the bag house is inoperative. A horizontal duct 20 communicates with an upper portion of the stack 14 and contains a damper or blast gate 22 which establishes proper balance or flow for the system.

A second glass melting furnace is indicated at 24 and is also heated by fuel oil or gas fired burners 26. In this instance, a furnace stack 28 communicates with an end of the furnace 24. The stack 28 is provided with a recuperator 30 which forms an annular chamber around the stack 28 and supplies combustion air therethrough to preheat the combustion air for the burners 26. Consequently, the furnace exhaust gases above the recuperator are often cooler than those in the stack 14. The stack 28 can have a similar stack cap 32 operated by a fluid-operated cylinder 34 so as to open and direct the gases directly to the atmosphere, if necessary. A horizontal duct 36 communicates with an upper end of the stack 28 and also has a damper or blast gate 38 to establish balance or flow for the system.

In a location between the furnaces 10 and 24 is a source of glass batch and specifically a batch house 40. The batch house 40 often literally is a building having windows and doors and contains the glass batch which is to be melted in the furnaces 10 and 24. The building is commonly vented by suitably located branch ducts 42 connected to a main vent duct 44. These ducts prevent an undue buildup of batch dust in the atmosphere within the batch house 40.

In this instance, the main vent duct 44 is connected by a horizontal duct 46 to a manifold or main passage means 48. The manifold 48 also communicates with the horizontal duct 20 for the furnace 10 and the horizontal duct 36 for the furnace 24. The manifold 48, in turn, connects with an inlet duct 50 of an exhaust blower 52. The blower 52 has an outlet duct 54 communicating with a bag house 56 through a short inlet duct 58. The manifold 48 is sufficiently long to provide a reaction time of at least several seconds for the reactable components in the gases, prior to reaching the bag house.

The venting gases from the batch house 40 are drawn out by the exhaust blower 52 along with the exhaust gases from the furnaces 10 and 24. The venting gases are replaced by make up air which is supplied through the batch house from leakage around windows, doors, etc. therein.

The bag house 56 can be of a type known in the art and includes filtering media in the form of a plurality of elongate sleeves 60 of filtering cloth located in the bag house 56 between the inlet duct 58 and an exhaust duct 62. Consequently, all of the exhaust gases supplied to the bag house 56 must pass through the filtering sleeves 60. The sleeves 60 provide a substantial filtering area for the exhaust gases and intercept and collect a substantial portion of the pollutants or contaminants carried by the exhaust gases. From time-to-time, the flow of gases through the filtering media can be reversed with the result that the material collected by the filtering media can be deposited in a funnel-shaped receptacle 64 at the bottom of the bag house. With the system according to the invention, this material can be supplied to the batch house 40 and used in the furnace 10 and 24.

As discussed in connection with FIG. 1, when the airborne particles from the batch house mix with the exhaust gases in the manifold 48, the particles form nuclei for condensibles in the exhaust gases to increase the condensation rate of the condensibles. In addition, the nuclei in the manifold 48 act as reaction sites for reactable components in the exhaust gases so that the condensibles can form reaction products which will condense more readily, such a reactant product being calcium tetraborate ($CaB_4O_7$), for example. It has also been found that sulphur dioxide is more fully or effectively removed from the exhaust gas by adding the batch venting air or gas. The relatively cool venting gases from the batch house 40 also cool the exhaust gases from the furnaces to further enhance the rate of condensation.

By way of example, the exhaust gases from the furnace 10 are at 1200° F. in the stack 14 and cool to 400° F. in the manifold 48 just before mixing with the venting gases from the horizontal duct 46. After the duct 46, the combined gases may be at a temperature of 220° F. and at a temperature of 210° F. just before mixing with the exhaust gases in the horizontal duct 36 from the furnace 24. The gases from the furnace 24 are at a temperature of 1300° F. in the lower portion of the stack 28 below the recuperator 30 and are at a temperature of 900° F. at the discharge end of the horizontal duct 36 near the manifold 48. The combined gases at the inlet 50 of the blower 52 are at a temperature of 250° F. so as to be substantially below the temperature of the gases usually supplied from the glass melting furnace to the bag house.

The invention enables significantly increased amounts of the contaminants in the furnace exhaust gases to be removed by the filtering media 60. By way of example, in the particular system of FIG. 2, the percentage of boron collected or removed from the exhaust gases increased to 96 percent from 92 percent, thereby cutting in half the amount exhausted through the exhaust duct 62. A similar reduction was also experienced with sulphur dioxide.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A method of controlling sodium tetraborate emissions from exhaust gases of a fossil fuel-fired glass melting furnace, said method comprising the steps of contacting said exhaust gases with particles of glass batch dust capable of reacting with the sodium tetraborate for a time sufficient to react with the sodium tetraborate to form clacium tetraborate, said batch dust being a combination of fines of the batch raw materials which are supplied to and melted in said glass melting furnace, and subsequently filtering the calcium tetraborate from the exhaust gases.

2. A method of removing boron from exhaust gases of a gas-fired glass melting furnace, said method comprising the steps of introducing into the exhaust gases particles of glass batch dust to provide condensation nuclei and reaction sites upon which the boron-containing volatiles can condense and react, said batch dust being a combination of fines of the batch raw materials which are supplied to and melted in said glass melting furnace, and subsequently filtering the condensed particles from the exhaust gases.

3. Apparatus for removing contaminants from flue gases emitted from a glass melting furnace, said apparatus comprising means forming an enclosed region in which a batch for producing glass is formulated and mixed for charging into the glass melting furnace, means for withdrawing air containing batch dust from said enclosed region, means for collecting and intermixing the flue gases emitted from the glass melting furnace and the air containing the batch dust, a gas-solids separator, and passage means for conveying the intermixed flue gases and air containing the batch dust to said gas-solids separator, said passage means being sufficiently long to provide sufficient time prior to the intermixed gases and air reaching said separator for reactable components in the combined gases and air to react, whereby contaminants in the flue gases can be more readily removed by said separator.

4. Apparatus according to claim 3 characterized by said glass melting furnace having a stack extending upwardly therefrom, said stack having a stack cap, and means for opening said stack cap to divert the flue gases when said gas-solids separator is not operating.

5. Apparatus for removing borates from flue gases emitted from a glass melting furnace, said apparatus comprising a batch house in the form of a building having windows and doors forming an enclosed region in which a batch for producing glass in formulated and mixed for charging into the glass melting furnace, duct means for venting air containing batch dust from said building, means for collecting and intermixing the flue gases emitted from the glass melting furnace and the air containing the batch dust, a gas-solids separator, and passage means for conveying the intermixed flue gases and air containing the batch dust to said gas-solids separator, said passage means being sufficiently long to provide sufficient time prior to the intermixed gases and air reaching said separator for condensibles in the flue gases to condense on particulate material in the air containing the batch dust, whereby contaminants in the flue gases can be more readily removed by said separator.

* * * * *